United States Patent Office 2,842,571
Patented July 8, 1958

2,842,571

METHOD OF OBTAINING STEROID HORMONE DERIVATIVES SUBSTITUTED IN THE 4-POSITION

Bruno Camerino, Bianca Patelli, and Alberto Vercellone, Milan, Italy, assignors to Società Farmaceutici Italia, a corporation of Italy No Drawing. Application October 26, 1956
Serial No. 618,438

Claims priority, application Italy March 29, 1956

6 Claims. (Cl. 260—397.45)

This invention relates to an improved method of obtaining steroid hormone derivatives substituted in the 4-position.

In the co-pending U. S. patent application Serial No. 598,754 of July 19, 1956, entitled "New Steroid Hormone Derivatives Substituted in the 4-Position and Method of Preparing Same," of which this application is a continuation-in-part, a method has been described and claimed for preparing compounds of the general formula

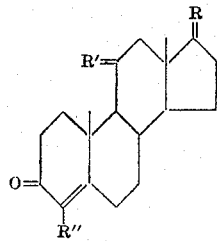

wherein R represents =O, (H)COCH$_3$, (H)OCOCH$_3$, (H)COCH$_2$OCOCH$_3$ and (OH)COCH$_2$OCOCH$_3$, R' represents H$_2$, (H)OH and =O, and R" represents —OH, acyloxy, F, Cl and Br.

According to said prior application, these compounds are obtained by reacting a 4,5-epoxy-3-keto-steroid (α and β epimers) of the general formula

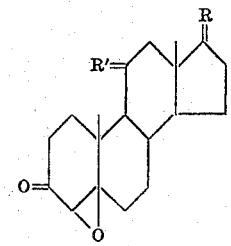

with mineral acids in an organic solvent.

By reacting, for example, a 4β,5-epoxy-3-keto-steroid or a 4α,5-epoxy-3-keto-steroid with either conc. sulfuric acid in anhydrous acetic acid, or with aqueous hydrofluoric acid in acetic acid or with diluted sulfuric acid in methyl alcohol or benzene, a 4-hydroxy-3-keto-Δ$^4$-steroid (enol-form) or the equivalent 3,4-diketo-steroid (keto-form) is obtained according to the following reaction scheme:

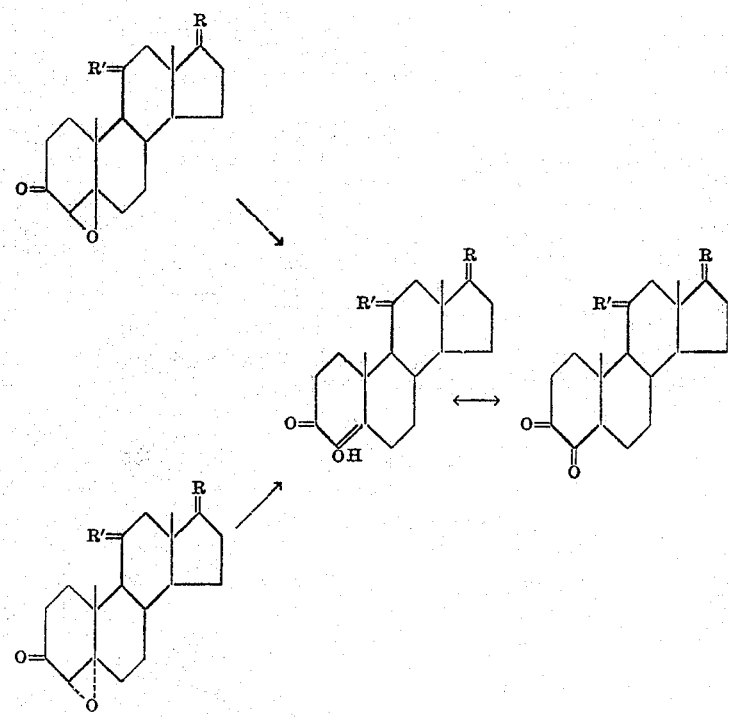

We have found now that the same results can be obtained, with the same starting materials and at equal yields, by using boron trifluoride, in the form of either an etherate or a similar complex, in an organic solvent, instead of mineral acid, such as conc. H$_2$SO$_4$. This procedure has the advantage of avoiding a strong acidic medium which, in some cases, could damage or further convert the starting material. For example, according to Examples 9, 10, 11, 12, 13 of said co-pending application, by treating 4,5-epoxides of testosterone and desoxycorticosterone with H$_2$SO$_4$ and acetic acid, the 17-acetates and the 21-acetates of the 4-hydroxy-steroid are obtained, whereas when proceeding according to the process of the present application, 4-hydroxy-steroids are obtained which have a free alcoholic group in the 17- and 21-positions.

The following examples are presented to illustrate the present invention without limiting its scope.

Example 1.—Δ⁴-pregnene-4-ol-3,20-dione 1 g. 4β,5-epoxy-pregnane-3,20-dione, M. P. 135° C., is dissolved in 25 cc. of anhydrous benzene, 0.435 g. of boron trifluoride-etherate are added and the reaction mixture is left standing overnight. It is then treated with a sodium bicarbonate solution, washed with water and dried. The residue, obtained upon distilling of the benzene, is recrystallized from methylalcohol and yields 350 mg. Δ⁴-pregnene-4-ol-3,20-dione, M. P. 225–230° C. The product does not lower the melting point when mixed with a standard sample obtained according to said copending application.

Example 2.—Δ⁴-pregnene-4-ol-3,20-dione 1 g. 4α,5-epoxy-allopregnane-3,11,20-trione, M. P. 234–235° C., are treated as in Example 1. 150 mg. Δ⁴-pregnene-4-ol-3,20-dione, M. P. 228–232° C., are obtained, which are identical with the product of Example 1.

Example 3.—Δ⁴-pregnene-4,21-diol-3,20-dione

Proceeding as in Example 1, from 1 g. 4β,5-epoxy-pregnane-21-ol-3,20-dione, M. P. 142–143° C., 400 mg. Δ⁴-pregnene-4,21-diol-3,20-dione, M. P. 210–212° C., are obtained.

For $C_{21}H_{30}O_4$: Found: 72.82% C; 8.88% H. Calc.: 72.80% C; 8.73% H.

Upon acetylating, in the usual manner, Δ⁴-pregnene-4,21-diol-3,20-dione diacetate, M. P. 198–200° C., is obtained, identical with a standard sample obtained according to said co-pending application.

Example 4.—Δ⁴-androstene-4,17β-diol-3-one

Proceeding as in Example 1, from 0.5 g. 4β,5-epoxy-etiocholane-17β-ol-3-one, M. P. 156–157° C., 200 mg. Δ⁴-androstene-4,17β-diol-3-one, M. P. 222–223° C., are obtained. Upon acetylating this compound in the usual manner, the diacetate, M. P. 170–172° C., is obtained, which is identical with the same compound prepared according to said co-pending application.

We claim:

1. The process of preparing a 4-substituted steroid hormone derivative of the general formula

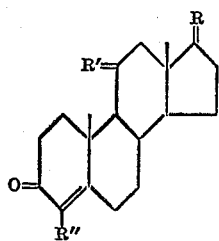

wherein R represents a member of the group consisting of =O, (H)OH, (H)COCH₃, (H)COCH₂OH and (OH)COCH₂OH, R' represents a member of the group consisting of H₂, (H)OH and =O, and R" represents a member of the group consisting of OH and acyloxy, which comprises dissolving a 4,5-epoxy-3-keto-steroid of the general formula

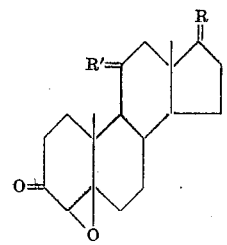

in an organic solvent, treating with boron trifluoride and recovering the 4-substituted steroid hormone.

2. The process according to claim 1, wherein said 4,5-epoxy-3-keto-steroid is dissolved in benzene and boron trifluoride is added in form of an etherate.

3. The process according to claim 2, wherein a member of the group consisting of 4-hydroxy-3-keto-Δ⁴-steroid (enol-form) and 3,4-diketo-steroid (keto-form) is obtained upon using 4,5-epoxy-3-keto-steroid as starting material.

4. The process according to claim 3, wherein said 4,5-epoxy-3-keto-steroid is a 4β,5β-epoxide.

5. The process according to claim 3, wherein said 4,5-epoxy-3-keto-steroid is a 4α,5α-epoxide.

6. The process according to claim 3 wherein said 4,5-epoxy-3-keto-steroid is a mixture of 4β,5β- and 4α,5α-epoxides.

No references cited.